United States Patent [19]

Fukushima

[11] Patent Number: 4,781,287

[45] Date of Patent: Nov. 1, 1988

[54] BOBBIN CONVEYING DEVICE

[75] Inventor: Kenji Fukushima, Kusatsu, Japan

[73] Assignee: Murata Kikai Kabushiki Kaisha, Kyoto, Japan

[21] Appl. No.: 905,252

[22] Filed: Sep. 8, 1986

[30] Foreign Application Priority Data

Sep. 9, 1985 [JP] Japan .................. 60-200115

[51] Int. Cl.⁴ .......................................... B65G 29/00
[52] U.S. Cl. ............................................ 198/803.01
[58] Field of Search ................. 198/803.01, 803.12, 198/465.1, 816, 840; 242/33, 35.5 A; 57/281, 270, 271

[56] References Cited

U.S. PATENT DOCUMENTS

| | | | |
|---|---|---|---|
| 3,332,538 | 7/1967 | Rice | 198/816 X |
| 3,368,663 | 2/1968 | Kufferath | 198/840 |
| 3,474,893 | 10/1969 | Morine | 198/816 X |
| 3,650,373 | 3/1972 | Kern et al. | 198/465.1 X |
| 3,698,536 | 10/1972 | Pray et al. | 198/803.12 X |
| 4,227,610 | 10/1980 | Gerdes et al. | 198/840 X |
| 4,375,845 | 3/1983 | Chambers et al. | 198/816 X |
| 4,566,263 | 1/1986 | Miyazaki et al. | 57/270 X |
| 4,576,341 | 3/1986 | Matsui et al. | 242/35.5 A |
| 4,598,869 | 7/1986 | Uchida et al. | 242/35.5 A |
| 4,630,435 | 12/1986 | Igel | 57/270 X |

FOREIGN PATENT DOCUMENTS 2603165  7/1976  Fed. Rep. of Germany ............ 198/803.12

Primary Examiner—Kenneth J. Dorner
Assistant Examiner—José V. Chen
Attorney, Agent, or Firm—Spensley Horn Jubas & Lubitz

[57] ABSTRACT

A bobbin conveying device in which a spinning bobbin preparation station and a winder are connected to each other by a first vertical conveying line and a second vertical conveying line, and each of the conveying lines is constituted of a single endless belt. A spinning bobbin in inserted and carried on a bobbin transporting medium and the spinning bobbin is conveyed on the endless belt being carried on the transporting medium.

7 Claims, 4 Drawing Sheets

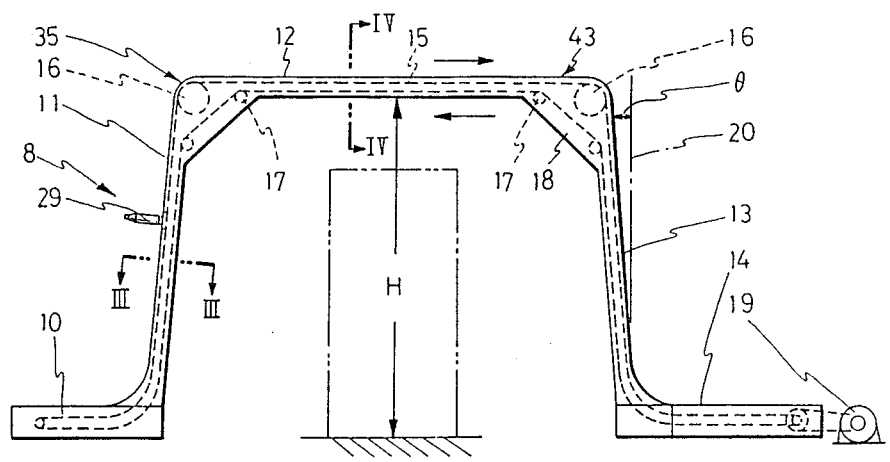
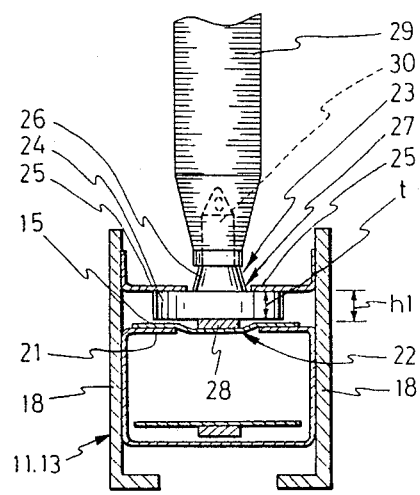
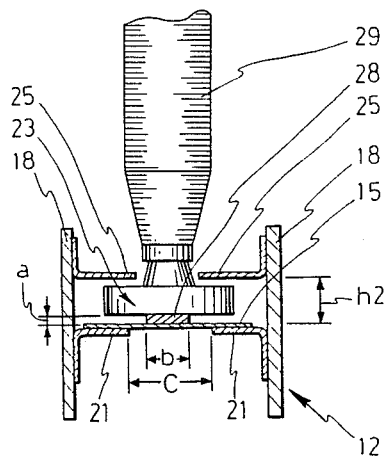

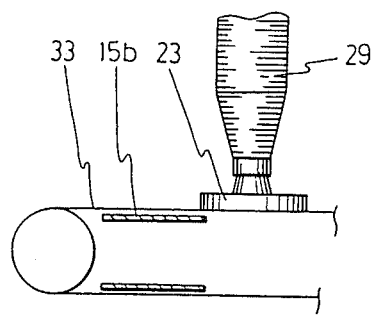
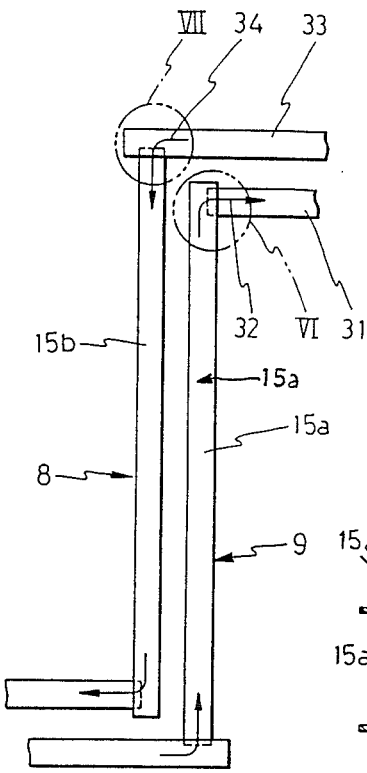
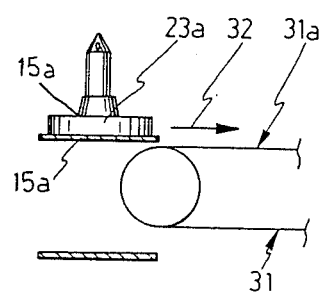

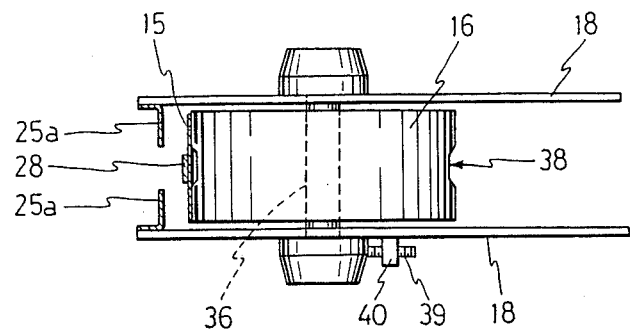
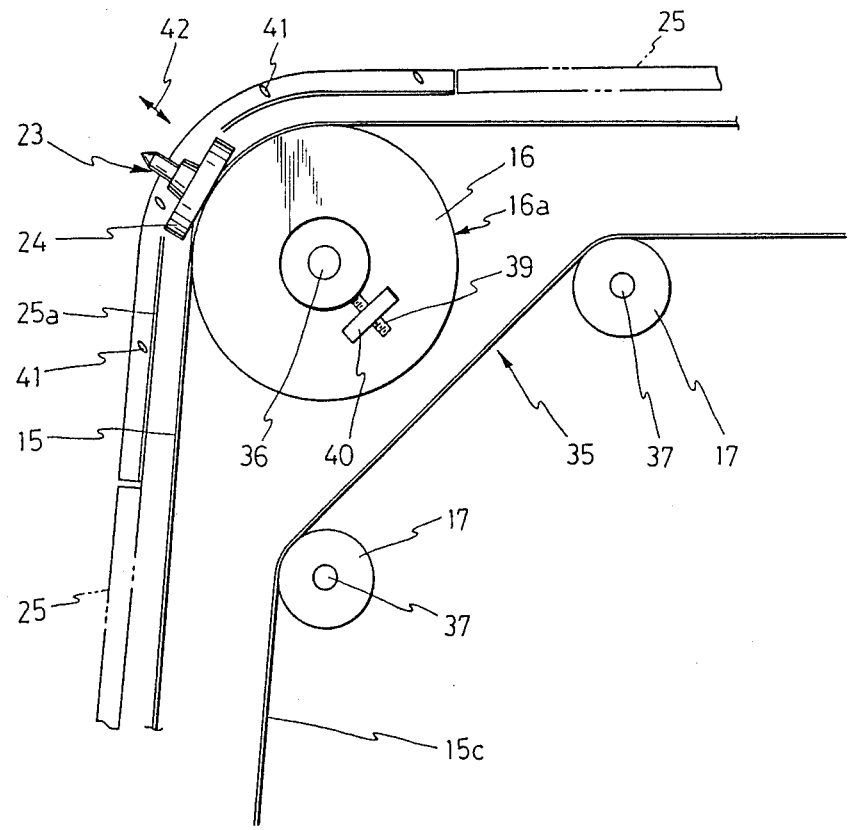

BOBBIN CONVEYING DEVICE

BACKGROUND OF THE INVENTION

Field of the Invention and Related Art Statement

The present invention relates to a bobbin conveying device.

There are various devices for conveying spinning bobbins produced by a spinning frame to a winder, depending on the kind of the winder.

On the other hand, the spinning bobbins supplied to the winder are generally fed to each winding unit in the state in which a yarn end is previously found, and, accordingly, a preparatory device for finding the yarn end is ordinarily disposed in proximity to the machine base of the winder.

However, the winder and the preparation station are in some cases located far apart from each other, from the view points of installation space, effective use of the factory, etc. In such a case, where a variety of devices and members are disposed between the preparation station and the winder, the conveying lines for feeding spinning bobbins or empty bobbins from the preparation station to the winder or vice versa are complicated, or intermittent feeding by car trucks or the like must be employed.

Object and Summary of the Invention

It is an object of the present invention to propose a device which is very simple in construction and by which bobbin can be conveyed smoothly between a preparation station and a winder.

The present invention resides in a bobbin conveying device in which a spinning bobbin preparation station and a winder are connected to each other by a first vertical conveying line, a horizontal conveying line and a second vertical conveying line, and each of the conveying lines is constituted of a single endless belt.

BRIEF DESCRIPTION OF THE DRAWINGS

FIG. 2 is a schematic front construction view of an embodiment of the conveying device according to the present invention;

FIG. 3 is a cross-sectional view along line III—III of FIG. 2;

FIG. 4 is a cross-sectional view along line IV—IV of FIG. 2;

FIG. 5 is a plan view showing the junction between conveyors;

FIG. 6 shows a cross-sectional front view of part VI of FIG. 5;

FIG. 7 shows a cross-sectional front view of part VII of FIG. 5;

FIG. 8 is an enlarged view of a corner part 35 in FIG. 2; and

FIG. 9 shows a plan view of the same.

DETAILED DESCRIPTION OF PREFERRED EMBODIMENTS

Figure 1:
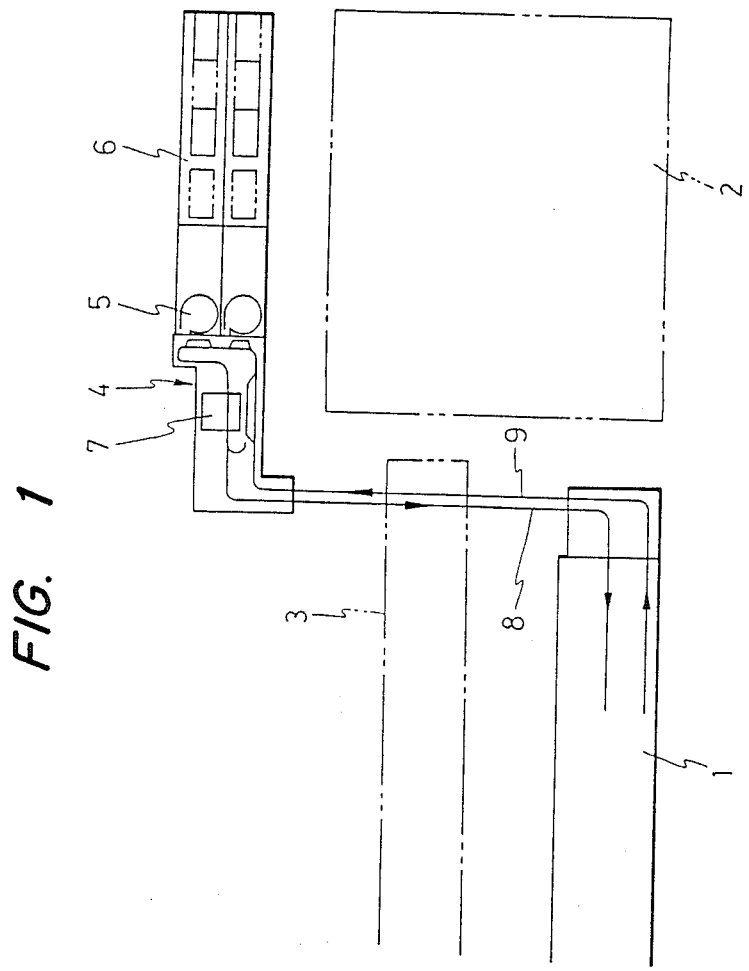
FIG. 1 shows a layout plan of an example of the positional relation between a winder and a preparation station.

A working example of the present invention will now be described below referring to the drawings.

In FIG. 1, numeral 1 denotes an automatic winder comprising a multiplicity of winding units arranged in parallel with each other, and a working area 2 for inspection, base packing, packing or the like of doffed packages is disposed at the side of the winder. Numeral 3 denotes other fiber machinery such as spinning frame and a winder.

A preparation station 4 for the spinning bobbins to be supplied to the winder 1 is disposed away from the winder 1. At this station are disposed a bobbin supplying device 5 for supplying the spinning bobbins to bobbin transporting media (hereinafter referred to as "trays"), a storage part 6 for bobbin cases containing the bobbins, a yarn end finding device 7 for finding the yarn end on the spinning bobbin supplied to the tray, etc.

Between the preparation station 4 and the winder 1 are provided bobbin conveying lines 8 and 9. Trays carrying thereon a spinning bobbin are fed along the feed line 8 in the direction of arrows, while trays carrying thereon an empty bobbin or a bobbin with a residual yarn which are discharged from the winder 1 are conveyed along the return line 9 in the direction of arrow to be returned to the preparation station 4, or only empty trays from which empty bobbins are removed in the region of the winder 1 are conveyed along the return line 9.

The conveying line 8 and the return line 9 are of the same construction and, accordingly, the conveying line 8 will be described in detail below.

In FIG. 2, the conveying line 8 comprises a junction part 10 for transferring the trays from a tray conveying line on the preparation station, a first vertical conveying line 11 for upward conveyance, a horizontal conveying line 12 disposed at a height H from the floor surface, a second vertical conveying line 13 for downward conveyance, and a junction part 14 for connection with a feed line on the winder side. All of the conveying lines 10, 11, 12, 13 and 14 are constituted of a single endless belt conveyor 15 as well as guide members 16, 17 for the conveyor 15, a frame 18, a drive motor 19 and the like.

At the junction parts 10, 14 and the horizontal conveying line 12, the belt is moved in a substantially horizontal plane, whereas at the first and second vertical conveying lines 11, 13, the belt 15 is moved substantially vertically. Though the vertical conveying lines 11, 13 in FIG. 2 are disposed slightly inclined ($\theta$) to the inside from the vertical line 20, the conveying lines 11, 13 can be disposed on the vertical line 20.

FIGS. 3 and 4 show cross sections of the conveying lines 11 and 12, respectively. Namely, FIG. 3 shows the vertical conveying line 11, in which a guide plate 21 for supporting the conveyor belt 15 is fixed to the inner surfaces of frames 18, 18, with a gap 22 at a central part. On the upper side of the guide plate 21 at a distance h1 approximately equal to the thickness (t) of a base 24 of a tray 23, guide plates 25, 25 for supporting the trays are fixed to the frames 18, 18, and a gap 27 for passage of a support part 26 of the tray 23 is formed between the guide plates 25, 25 over the entire region. In addition, on the tray feed surface of the conveyor belt 15 for conveying the trays, a friction member 28 having a thickness of a and a width of b is integrally fixed to a central part in the width direction of the belt over the entire length of the belt so that the trays 23 are fed along the vertical conveying lines 11 and 13 in the condition where the base 24 of the tray 23 is clamped between the friction member 28 and the guide plates 25, 25. Namely, during when the tray 23 is moved along the vertical conveying lines 11, 13, the belt 15 is in the state of being flexed to the side of the gap 22 at the part of the friction member 28, and the elasticity of the belt 15 so functions that the friction member 28 presses the tray 23 to the side of the guide plates 25, 25. Accordingly, the width b of the friction member 28 and the gap c between the guide plates 25 and 25 must satisfy the relation of c>b.

FIG. 4 shows a cross sectional view of the horizontal conveying line 12, in which the same numbers as in FIG. 3 denote respectively the same members as those in FIG. 3. A different point between FIG. 3 and FIG. 4 is that the spacing h2 between the upper surface of the belt 15 on the guide plates 21, 21 and the upper guide plates 25, 25 in FIG. 4 is larger than that h1 in FIG. 3. Namely, on the horizontal feed line 12 it is sufficient for the tray 23 to be simply placed on the belt 15 and, unlike in the case of the vertical conveying lines, the base 24 of the tray needs not be clamped between the friction member 28 and the guide plates 25, 25; therefore, drag on the belt can be reduced, and a motor of smaller capacity can be used as the drive source. Numeral 29 denotes a spinning bobbin erectedly fitted over a peg 30 of the tray 23.

FIGS. 5 to 7 shows the relationship of connection of the single conveyor belt with the tray conveyor belts on the winder side and the preparation station side. Namely, since the bobbin 29 is fed on the conveyor in the state of being erected on the tray 23, an arrangement is provided so that the bottom surface of the tray does not interfere with the side edge of another conveyor when the tray is transferred from one conveyor to another. FIG. 6 shows a cross-sectional front view of the junction part VI of FIG. 5, in which the feeding surface 15a of the conveyor 15a of the return line 9 for conveying the empty trays 23a from the winder side is disposed slightly above the feeding surface 31a of the conveyor 31 on the preparation station side, and the tray 23a is transferred in the direction of arrow 32 by the guide plates. On the other hand, FIG. 7 shows a cross-sectional view of the junction part VII of FIG. 5, in which the spinning bobbin feed conveyor 33 on the preparation station side is disposed above the conveyor 15b of the conveying line 8, and the bobbin is transferred in the direction of arrow 34 by the guide plates. Namely, in either case, at the junction part, the tray supporting surface of the conveyor on the upstream side with respect to the feeding direction of the trays is disposed at least above that of the conveyor on the downstream side.

Furthermore, FIGS. 8 and 9 show a corner part 35 through which the vertical conveying line 11 is connected with the horizontal conveying line 12. At the corner part 35, a large diameter guide pulley 16 for the tray feeding conveyor 15 and small diameter guide pulleys 17, 17 for the conveyor 15c on the other side are supported on the frames 18, 18 through shafts 36 and 37, 37, respectively. A peripheral surface 16a of the pulley 16 for contact with the belt is provided with a recessed groove 38 over the entire peripheral surface of the roller. Namely, as shown in FIG. 3, the groove 8 is for escape of the flexed portion of the belt 15 and, accordingly, i is not necessary to provide the groove in the pulleys 17, 17 which do not serve for conveying the trays. In addition, numeral 39 denotes a bolt for adjusting the position of the pulley 16. The bolt 39 is engaged with a nut 40 fixed to the frame 18, and the tip of the bolt presses against the shaft 36 of the pulley 16, thereby making it possible to adjust the tension on the belt 15. The bolt can be provided also on the side of the pulley 17.

Furthermore, the guide plates 25a, 25a for restricting the upper surface of the base 24 of the tray at the corner part 35 are fixed to the frames 18, 18 separately from the guide plates 25, 25 at the other, straight feed line parts. The position of the guide plates 25a, 25a can be adjusted in the directions 42 toward and away from the center of the roller 16 along slots 41, 41 formed in the guide plates. Namely, at the corner part, the base 24 of the tray 23 is deflected as shown in FIG. 8 and, accordingly, the deflection cannot be performed if the base 24 is in the close contact state as shown in FIG. 3; therefore, the spacing h1 in FIG. 3 is adjusted in conformity with the diameter of the roller 16, or the curvature, whereby the change of direction can be smoothly performed.

The other corner part (43 in FIG. 2) is constructed in the same manner as the corner part shown in FIG. 8.

Accordingly, the tray supplied with the spinning bobbin at the preparation station 4 in FIG. 1 is conveyed upward, conveyed forward and conveyed downward along the conveying line 8 constituted of the single belt conveyor 15 shown in FIG. 2 to the winder side 1, while the tray discharged from the winder side is similarly fed along the conveying line 9 to be returned to the preparation station 4. Namely, through the horizontal conveying line 12 in FIG. 2 is disposed at a height H from the floor surface, the bobbins can be fed by a single belt drive motor 19 without need for special lift devices, and the trays are moved extremely smoothly.

Though the motor for driving the single belt in the conveying line 8 is provided at an end part on the winder side (FIG. 2), a similar motor in the return line 9 is preferably provided on the side of the preparation station 4 in view of smooth conveyance because of the tray mounting side belt (15a in FIG. 6) being the tension-side belt. In addition, through in the abovementioned working example the bobbin supplying device is provided at the preparation station 4, direct connection of the system with a spinning frame is also practicable, of course.

As stated hereinabove, according to the present invention the bobbin conveying line between the preparation station and a winder remote therefrom is constituted of a single conveyor belt, and accordingly, bobbins or integral sets of a tray and a bobbin are fed extremely smoothly, and the construction of the feed line itself is simple.

What is claimed is:

1. A bobbin conveying device for conveying a bobbin on a transporting medium having a peg between a spinning preparation station and a winder, said device comprising:
   an endless conveyor belt, said endless conveyor belt having a first substantially vertical conveying section, a substantially horizontal conveying section, and a second substantially vertical conveying section;
   the conveyor belt being disposed between frames,
   lower guide plates for supporting the conveyor belt which are fixed to the inner surfaces of the frames with a first gap at a central part thereof;
   upper guide plates which are fixed to the inner surfaces of the frames at a distance from the lower guide plates with a second gap for a passage of the peg of the transporting medium, and
   a drive motor for the endless conveyor belt.

2. A bobbin conveying device as claimed in claim 1, further comprising:
a friction member integrally fixed to a central part of the conveyor belt over the entire length thereof whereby at least a portion of the transporting medium is clamped between the friction member and the upper guide plate along the substantially vertical conveying sections.

3. A bobbin conveying device as claimed in claim 2, wherein the width of the friction member is smaller than the width of the first gap between the lower guide plates.

4. A bobbin conveying device as claimed in claim 3, wherein said distance between the upper guide plates and the lower guide plate is set to be larger at the substantially horizontal conveying section than at the substantially vertical first and second conveying sections.

5. A bobbin conveying device as claimed in claim 4, further comprising:
a transporting medium feeding conveyor belt, a guide pulley for the transporting medium feeding conveyor belt supported on the frames at a corner part through which each of said first and second substantially vertical conveying sections is connected with the substantially horizontal conveying section, and said guide pulley having a peripheral surface for contact with the belt, said peripheral surface being provided with a recessed groove therein.

6. A bobbin conveying device as claimed in claim 5, further comprising means for adjusting the relative position of the guide pulley with respect to the frame to thereby adjust the tension of the transporting medium feeding conveyor belt.

7. A bobbin conveying device as claimed in claim 6, wherein said upper guide plates are separately provided at the corner part from the guide plates at the other straight conveying line parts and slots are formed in said upper guide plates so that the relative position of the upper guide plates at the corner part can be adjusted with respect to the center of the guide pulley.

* * * * *